United States Patent [19]

Brydon

[11] Patent Number: 5,114,285
[45] Date of Patent: May 19, 1992

[54] DOOR DRILLING TEMPLATE

[76] Inventor: Michael K. Brydon, 19744 Beach Blvd. #432, Huntington Beach, Calif. 92648

[21] Appl. No.: 664,317

[22] Filed: Mar. 4, 1991

[51] Int. Cl.⁵ .......................... B27C 5/00; B23B 41/00
[52] U.S. Cl. .................................. 408/115 R; 33/197; 144/144.5 R; 408/72 R; 408/241 B
[58] Field of Search .............. 33/197; 408/72, 115 R, 408/115 B, 241 B; 144/144.5

[56] References Cited

U.S. PATENT DOCUMENTS

| | | | |
|---|---|---|---|
| 3,301,288 | 10/1964 | Norue et al. | 144/144 |
| 3,730,236 | 5/1973 | Frydenberg | 144/027 |
| 3,738,013 | 6/1973 | Gregory | 33/197 |
| 3,910,327 | 10/1975 | Heckenlaible | 144/136 |
| 3,985,168 | 10/1976 | Lundquist | 144/144.5 |
| 4,114,664 | 9/1978 | Cotton | 144/134 |
| 4,552,193 | 11/1985 | Armas | 144/144.5 |
| 4,715,125 | 12/1987 | Livick | 408/115 R |
| 4,765,786 | 8/1988 | Krogh | 408/115 R |
| 4,813,826 | 3/1989 | Riedal | 408/115 R |

FOREIGN PATENT DOCUMENTS 3020970 12/1981 Fed. Rep. of Germany ... 408/115 B
2360370 4/1978 France ........................... 408/115 R

*Primary Examiner*—W. Donald Bray

[57] ABSTRACT

A three-sided drilling template for a door is provided that is formed from a rigid material. The first and second sides of the template are parallel and contact opposite sides of the door. The third side of the template, orthogonal to and bridging the span between the first and second sides of the template, contacts the edge of the door. A plurality of through guide holes are located in each side of the template and mark the centers of mounting holes for the mounting of operating hardware such as door locks and knobs. Markings on the template indicate the specific purpose of each through guide hole, and marked circles concentric with the through guide holes indicate the correct size of the mounting holes. A rectangular extension on the interior surface of the third side fits into a lock face recess previously formed or pre-machined in the edge of the door for accurate alignment of the template to the door.

5 Claims, 4 Drawing Sheets

DOOR DRILLING TEMPLATE

FIELD OF THE INVENTION

This invention relates to drilling templates, and, more specifically, to a drilling template for doors that correctly sizes and positions mounting holes for door operating hardware, such as locks and door knobs.

BACKGROUND OF THE INVENTION

A wide variety of door operating hardware, such as door knobs and locksets, is available for mounting on doors. Such door operating hardware requires installation onto the door, usually with the use of through bolts that engage mounting plates on either side. This type of installation typically requires through holes to accept the mounting bolts, and other holes or recesses to accept other working parts of the operating hardware.

Manufacturers of door operating hardware generally include an inexpensive paper template with the hardware that helps the installer to position and align the monting holes correctly on the door. Clearly these manufactures, striving to reduce the cost of the operating hardware package and working under the assumption that the template will be used only once, are not concerned with the durability of these templates. Therefore the paper template is flimsy, making it dufficult to work with, is inefficient, requiring layout and adjustment time, does not provide a physical guideway for piercing tools and must be transferred from one side of the door to the other side.

Thus a paper sheet is not thick enough to guide the drill bit in an angle normal with respect to the plane of the door, further increasing the chance of misaligned holes on the opposite side of the door.

The prior art and common practise within the United States does not show, reflect, or teach any alternate template device for the rapid and accurate execution of door preparation for operating hardware.

Clearly, then, there is a need for a door drilling template that facilitates the correct sizing, positioning, and alignment of munting holes for a variety of door operating hardware, is designed for durability, and is relatively inexpensive to manufacture.

SUMMARY OF THE INVENTION

The present invention is a template for preparing a door for the mounting of operating hardware. The template is designed to fit over that edge of a door where a lockset or door knob or other operating hardware is to be mounted. The template as defined in the preferred embodiment or best mode is a three-sided rectangular form or channel. The two opposing sides of the channel are designed to fit against the opposing sides of the door. The third side of the template fits flush with the edge of the door. All three sides of the template have a number of through guide holes marking the centers or mounting holes for the operating hardware. Markings on the template indicate the specific purpose of each through guide hole, and circles concentric with the through guide holes are marked on the surface of the template to indicate the size of each mounting hole to be drilled into the door. Further, a raised portion on the interior surface of the third side is used for registering the template into the lockset recess previously routed in the edge of the door to accurately position the template prior to drilling the pilot holes. The two opposing sides, i.e., sides one and two, are formed at an angle with side three such that they slightly converge so that when placed on the door, sides one and two are forced by the door to flex apart. This provides a gripping action to hold the template firmly onto the door.

In operation, the template is positioned over the edge of the door such that the third side rests aganist the edge of the door, the first and second sides thereby in contact with the side surfaces of the door. Pilot holes are then drilled into the door by positioning a drill bit into any of the through guide holes such that it is normal to either side or the edge of the door and then drilling into the door.

This invention provides a durable drilling template that is capable of repeated use and that facilitates the accurate positioning, aligning, and pre-drilling of mounting holes into door. Further, it is relatively simple and inexpensive to manufacture, transport, and use. Because of the gripping action of the invention and template registration into the lockset recess, the work and worry of alignment and of pre-drilling are separated into two distinct operations and thereby more easily controlled and accomplished. Other features and advantages of the present invention will become apparent from the following more detailed description, taken in conjunction with the accompanying drawings, which illustrate, by way of example, the principles of the invention.

DESCRIPTION OF THE DRAWINGS

The accompanying drawings illustrate the invention. In such drawings.

DETAILED DESCTIPTION OF THE PREFERRED EMBODIMENT

Figure 1:
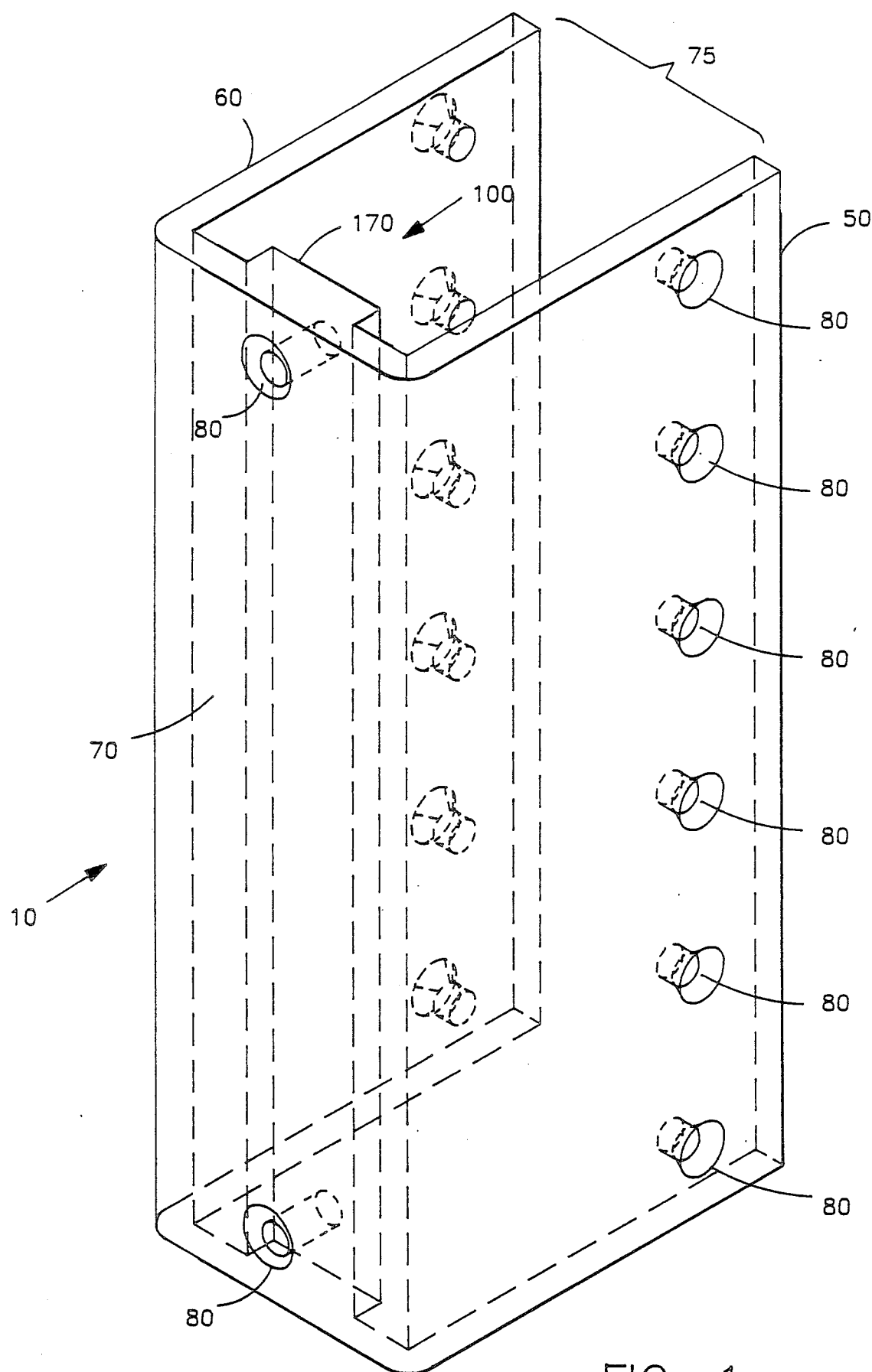
FIG. 1 is a perspective illustration of the best mode of the invention, showing a raised portion on the inside surface of a third side.
Figure 2:
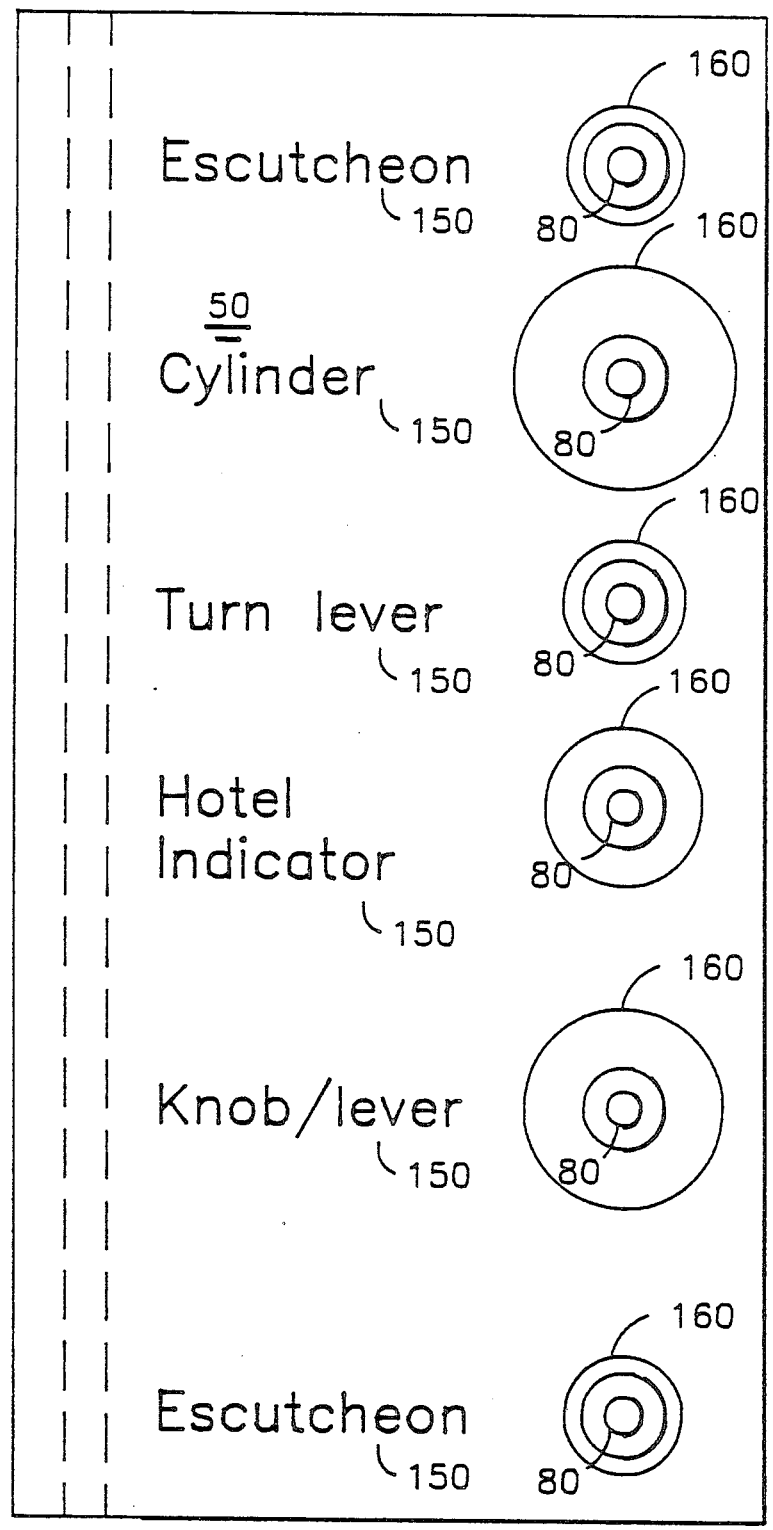
FIG. 2 is a right side elevation view of the invention of FIG. 1, illustrating sample markings for indicating the specific purpose of each through guide hole.
Figure 3:
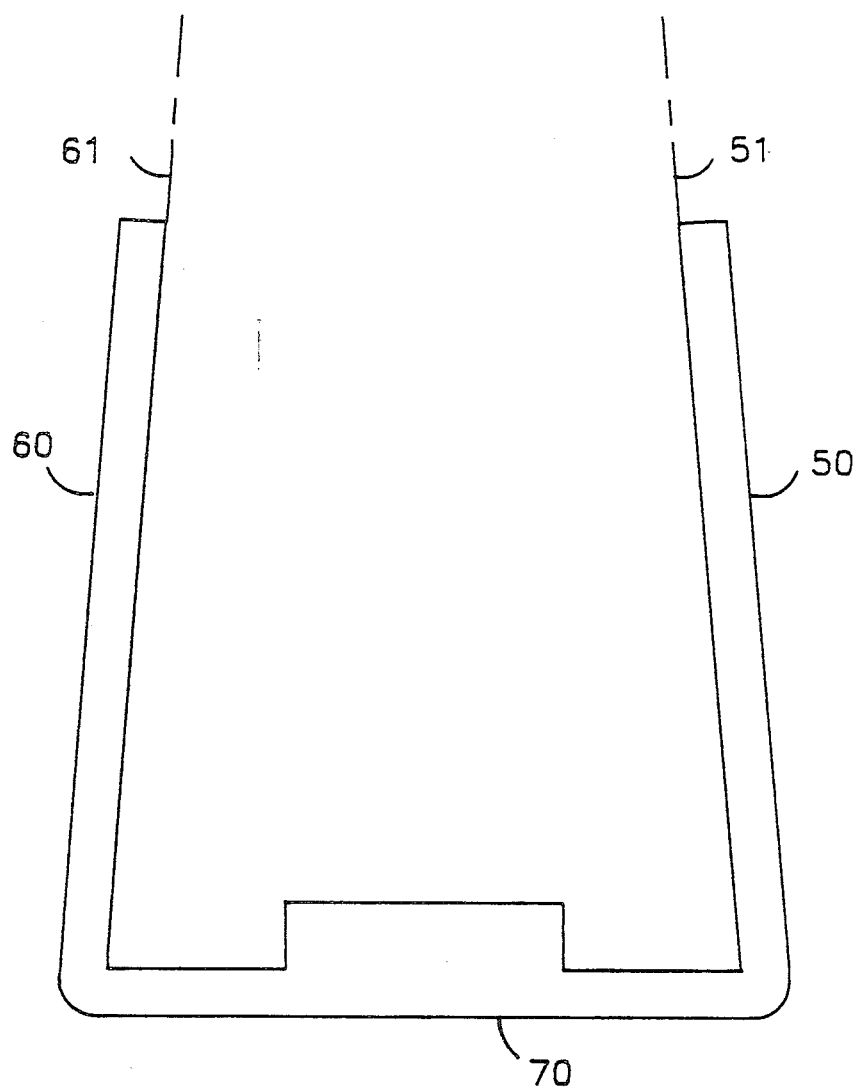
FIG. 3 is a top plan view of the invention illustrating slightly convergent first and second sides.
Figure 4:
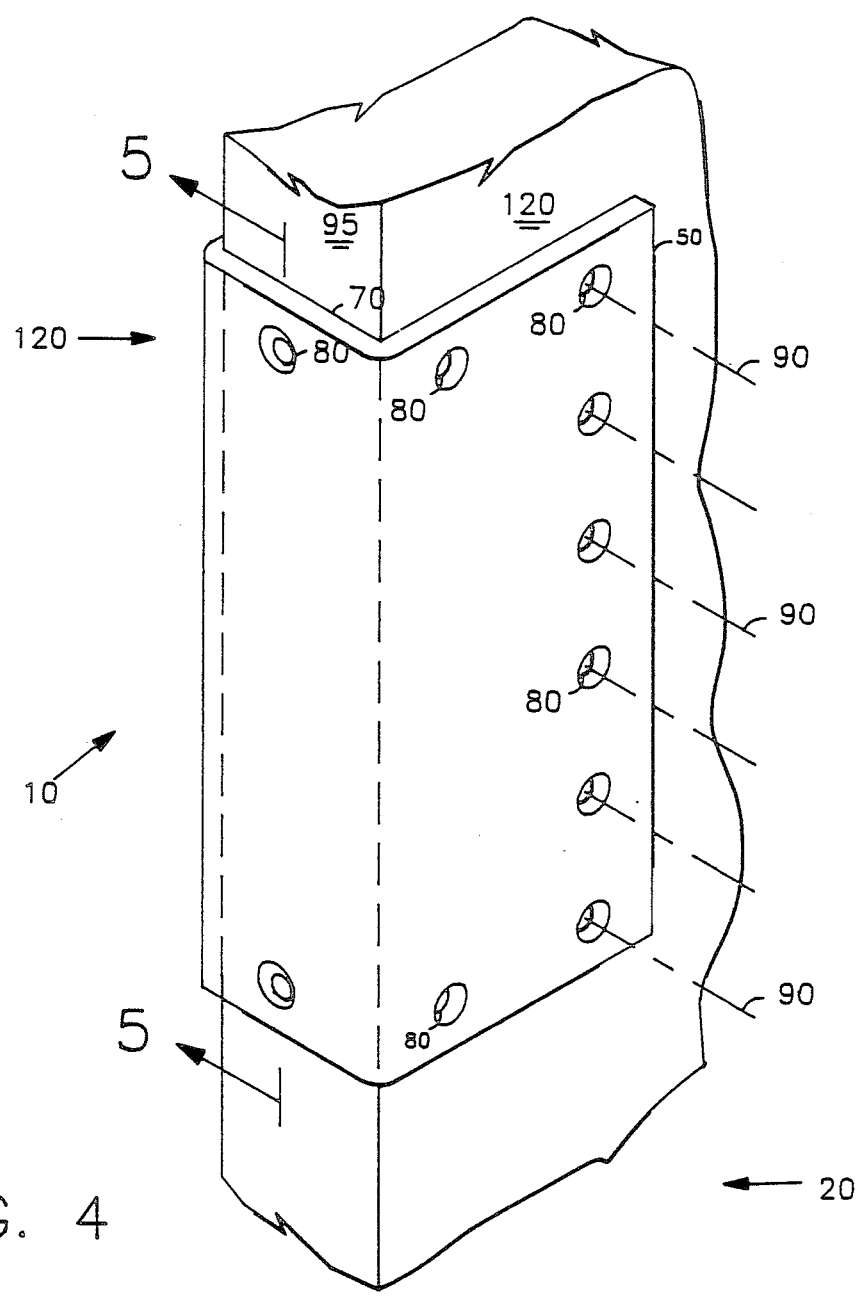
FIG. 4 is a perspective illustration of the invention of FIG. 1 shown mounted on the workpiece.

FIGS. 1-6 show a template 10 for preparing a door 20, the door 20 having a lockset recess 180 for the mounting of operating hardware such as door knobs, lock bolts, hinges, and the like. The template 10 comprises a first side 50 and a second side 60 supported in generally parallel planes by a third side 70. The third side 70 brides the span 75 between the first side 50 and second the side 60. In one embodiment of the invention, the first side 50 and the second side 60 lie in slightly convergent planes 51, 61 respectively (FIG. 3). The first side 50, the second side 60, and the third side 70 all have a plurality of through guide holes 80 marking the centers of mounting holes 90 (FIG. 4) for the mounting of various operating hardware.

In operation, the template 10 is placed over an edge 95 of the door 20, the interior surface 100 of athe third side 70 in contact with the edge 95 of the door 20, and the first side 50 and the second side 60 lying in contact with the sides 120 of the door 20. The drilling of pilot holes 130 in the door 20 is facilitated by the through guide holes 80.

In the preferred embodiment of the invention, markings 150 (FIG. 2) indicate the specific purpose of each through guide hole 80. Further, a plurality of marked cicles 160, concentric with through guide holes 80, are included to indicate the size of the mounting holes 90 to be drilled into the door 20 at the through guide holes 80.

Figure 5:
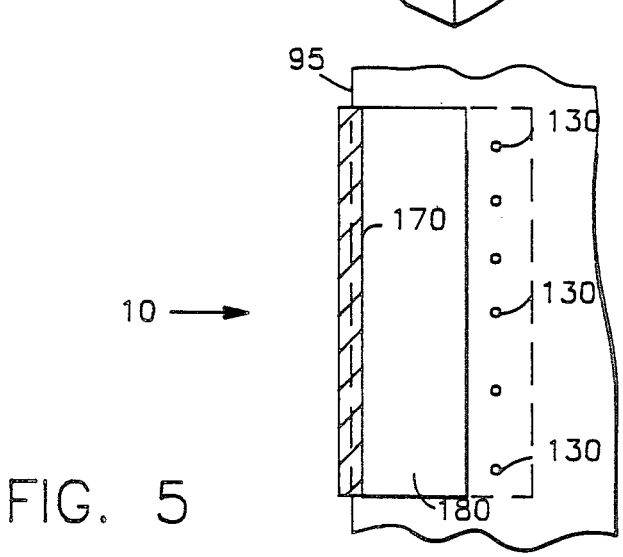
FIG. 5 is a cross-sectional view of the invention of FIG. 1, taken generally along lines 5—5 of FIG. 4.

Also in the preferred embodiment of the invention, a rectangular extension 170 on the interior surface 100 of the third side 70 is provided for fitting into the lockset recess 180 in the door 20 in order to accurately position the template 10 prior to drilling the pilot holes 130 (FIG. 5).

The first side 50, second side 60, third side 70, and the rectangular extension 170 may easily be formed in one operation and as one integrated part through use of injection molding techniques, making the device relatively simple to manufacture. For durability the template 10 may be manufactured from any of several high-quality plastics, and is preferably transparent to facilitate visually locating the template on the door.

An alternate embodiment of the present invention is similar to the prefered embodiment described above, except that the template 10 is L-shaped, consisting of a first side 50 and a third side 70 (FIG. 6). This alternative embodiment has the advantage of being simpler to manufacture and requiring less material. A disadvantage of this alternate embodiment is that the template 10 is not self-supporting on the door 20, and must be held in place during use.

What is claimed is:

1. A template for preparing a door for the mounting of operating hardware, the door having a lockset recess, the template comprising:

a channel having a first side and a second side supported in generally parallel planes by a third side, said third side defining a space between said first and second sides, said first, second, and third sides having a plurality of through guide holes marking the centers of proposed mounting holes for said operating hardware, thereby with the template placed over the edge of said door, the interior surface of the third side being in contact with the edge of the door, and said first and second sides lying in contact with the sides of the door, the accurate placement of pilot holes in the door is facilitated by said through guide holes.

2. The template of claim 1 wherein each said side has marking to indicate the specific purpose of each said through guide hole.

3. The template of claim 1 wherein each said through guide holes has a marked circle positioned concentric with the through guide hole to indicate the size of the mounting hole to be drilled into the door at the through guide hole.

4. The template of claim 1 wherein the third side has a rectangular extension on said interior surface of the third side for fitting into the lockset recess in said door in order to accurately position the template, relative to the lockset recess, prior to drilling said pilot holes.

5. A template for preparing a door for mounting a lockset, the door having a lockset recess in the edge of the door, the template comprising:

a flexible channel having a first side and a second side supported in generally parallel planes by a third side, said third side defining a space between said first and second sides, said first, second and third sides having a plurality of through guide holes marking the centers of proposed mounting holes for said operating hardware, said first and second sides lying in slightly convergent planes, whereby the template is placed over the edge of said door with the interior surface of the third side in contact with the outer edge of the door and the first and second sides being flexed apart slightly so as to lie in contact with the side surfaces of the door so that pilot holes may be drilled in exact positions in the surface of the door by drilling into the door at each said through guide hole and the template is held in place on the door by clamping action of the flexed opposing sides one and two.

* * * * *